(12) United States Patent  
Coffield et al.

(10) Patent No.: US 8,857,033 B2  
(45) Date of Patent: Oct. 14, 2014

(54) ORIENTED PACKAGE COMBINATION FOR A MOLDED ELASTOMERIC PRODUCT

(75) Inventors: Timothy P. Coffield, Grand Rapids, MI (US); Kenneth A. Longstreet, Grant, MI (US)

(73) Assignee: Illinois Tool Works Inc., Glenview, IL (US)

( * ) Notice: Subject to any disclaimer, the term of this patent is extended or adjusted under 35 U.S.C. 154(b) by 973 days.

(21) Appl. No.: 12/353,458

(22) Filed: Jan. 14, 2009

(65) Prior Publication Data

US 2009/0267262 A1   Oct. 29, 2009

Related U.S. Application Data

(60) Provisional application No. 61/025,929, filed on Feb. 4, 2008.

(51) Int. Cl.
| | |
|---|---|
| B23P 11/02 | (2006.01) |
| B65D 85/02 | (2006.01) |
| B65D 57/00 | (2006.01) |
| B29C 55/00 | (2006.01) |
| B29K 21/00 | (2006.01) |

(52) U.S. Cl.  
CPC .............. *B65D 57/00* (2013.01); *B65D 85/02* (2013.01); *B29C 55/00* (2013.01); *B29K 2021/00* (2013.01)  
USPC .......................................... 29/450

(58) Field of Classification Search  
CPC ...... B23P 11/02; A47C 7/282; A47C 23/064; B29C 27/12; B29C 27/302; B29C 2038/0028; C08L 53/025  
USPC ........................ 29/892.1, 446, 448, 450, 520; 264/288.4, 289.6, 291, 320, 342 RE; 254/393, 394–400; 474/119, 120, 474/122–123, 130  
See application file for complete search history.

(56) References Cited

U.S. PATENT DOCUMENTS

| | | | | |
|---|---|---|---|---|
| 2,107,695 | A * | 2/1938 | Geare | 206/303 |
| 2,690,253 | A * | 9/1954 | Francois | 206/335 |
| 5,010,636 | A * | 4/1991 | Hall et al. | 29/446 |
| 5,318,479 | A * | 6/1994 | Lawroski | 474/130 |
| 5,944,929 | A * | 8/1999 | Vallauri et al. | 156/162 |
| 6,324,814 | B1 * | 12/2001 | Rayman | 53/399 |
| 6,939,499 | B2 * | 9/2005 | Merrill et al. | 264/288.4 |
| 2006/0267258 | A1 * | 11/2006 | Coffield et al. | 267/140.5 |
| 2007/0035064 | A1 * | 2/2007 | Coffield | 264/257 |

* cited by examiner

*Primary Examiner* — Moshe Wilensky

(57) ABSTRACT

A method of packaging a molded elastomeric material includes the steps of (a) molding an elastomeric product; (b) orienting the elastomeric product by stretching or compressing the elastomeric product; (c) retaining the elastomeric product in an at least partially stretched or partially compressed configuration by mounting or securing the elastomeric product to a shunt; and (d) releasing the product from the shunt, whereby the product is capable of shrinking or expanding to its final position after it is removed from the shunt.

17 Claims, 4 Drawing Sheets

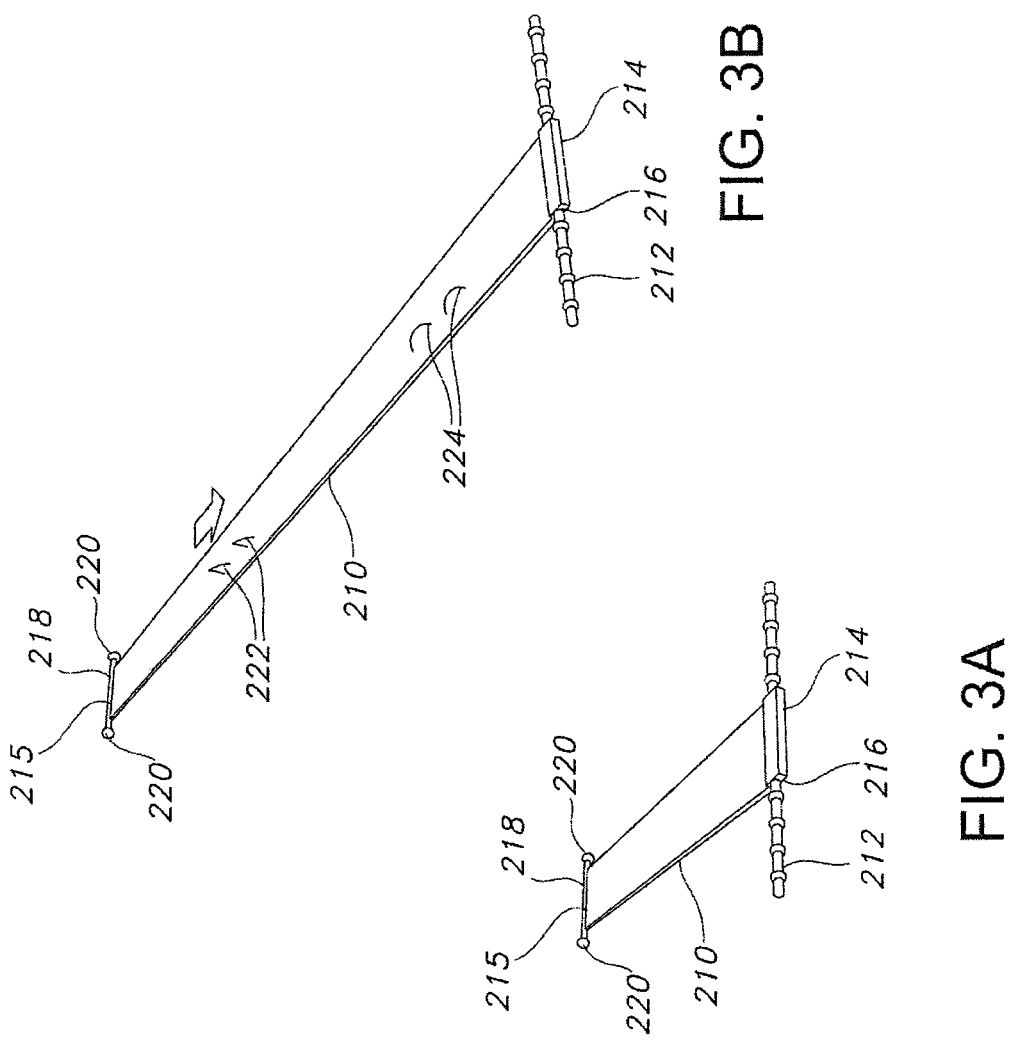

US 8,857,033 B2

ORIENTED PACKAGE COMBINATION FOR A MOLDED ELASTOMERIC PRODUCT

CROSS-REFERENCE TO RELATED APPLICATION

This application claims the benefit of priority under 35 U.S.C. 120 of U.S. Patent Provisional Application 61/025,929, filed Feb. 4, 2008, which is incorporated herein by reference in its entirety.

BACKGROUND OF THE INVENTION

The present invention relates to molded elastomeric products, and more particularly to orienting molded elastomeric products.

Molded elastomeric products have a wide variety of applications. To enhance the performance of these products in certain applications, U.S. Patent Publication No. 2005/0279591 A1 teaches that it may be beneficial to orient the product, which involves stretching and releasing the product to align the crystalline structure of the plastic in a particular direction, or, in some cases, multiple directions. Orientation of a product will alter its material properties, including its stiffness and/or support characteristics. Typically, the product will be oriented to such a degree that the oriented product has materially different material characteristics in the oriented direction than in other directions. The amount of stretch required to obtain the desired material characteristics will vary from application to application, but in most applications, the desired orientation will occur when the product is stretched to roughly two times its original dimension. Because the product is stretched beyond its elastic limit, it recovers to an intermediate dimension that is deformed from its original length. This deformation is non-recoverable, permanent deformation. As a result of this orientation and non-recoverable deformation, a degree of permanent deformation is removed from the oriented product, such that when subsequent stresses within the desired normal operating load are applied to the oriented product, the product resists permanent deformation over time (i.e. creep).

Although the product may be oriented by stretching using a variety of methods and under a variety of conditions, a number of parameters may be controlled to provide the product with a desired amount of orientation. For example, a slow, controlled stretch aids in maintaining a uniform orientation across the membrane. The orientation may also be cyclic, in which the product is oriented by stretching it to a first distance, then relaxed to a second, intermediate distance, and then stretched to a second distance greater than the first. The sequence may be repeated as many times as necessary to achieve the desired orientation. A cyclic orientation process helps compensate for any irregularities within the material to provide a uniform stretch, because areas of greater or lesser stretch will even out after multiple cycles. Thus, the support characteristics of the molded product are highly adjustable by the orientation process, thereby permitting the molded elastomeric product to be tailored to a variety of different applications.

After the product is released from the final stretch of the orientation process, the product recovers to an equilibrium position. Manufacturing processes involving orientation commonly include a recovery station where the oriented products sit until they have completely recovered to the equilibrium position, at which the product is ready to be put into its final application. Unfortunately, the recovery process adds time to the manufacturing cycle, and, in some applications, it may be difficult to manipulate the product into its final application once the product has recovered.

SUMMARY OF THE INVENTION

The embodiments of the present invention provide methods and packaging combinations that delay the final recovery of molded elastomeric products from the stretch involved in orientation, such that the products may recover and shrink into advantageous arrangements during their end use applications.

According to one aspect, a method of packaging a molded elastomeric material generally includes the steps of (a) molding an elastomeric product; (b) orienting the elastomeric product by stretching or compressing the elastomeric product; (c) retaining the elastomeric product in an at least partially stretched or partially compressed configuration by mounting or securing the elastomeric product to a shunt; and (d) releasing the product from the shunt, whereby the product is capable of shrinking to its final position after it is removed from the shunt.

According to another aspect, the present invention provides a package combination including a molded elastomeric product and a shunt adapted to retain the molded elastomeric product in an at least partially stretched or compressed position, whereby the product is adapted to shrink or recover to an equilibrium position after it is removed from the shunt.

In one embodiment of these aspects, the molded elastomeric product is a belt, such as a pulley belt. In this embodiment, the method includes orienting the belt, for example, by mounting the belt to at least two pulleys, which may include a drive pulley and a pulley adapted to orient the belt by stretching and optionally twisting the belt. The belt is mounted to or stretched around a shunt adapted to retain the belt in an at least partially stretched position. The belt is then removed from the shunt and applied to a final set of pulleys for use as a pulley belt. Removal of the belt from the shunt allows the belt to recover to its equilibrium state and shrink to tightly fit on the pulleys.

In another embodiment, the molded elastomeric product is a fastener such as a snap-in or clip-type fastener. The fastener is oriented by stretching the fastener in a lengthwise direction and releasing the fastener to allow it to shrink and recover. During the orientation process, a shunt is mounted to the fastener to retain it in an at least partially stretched position. When the shunt is removed, the fastener is used, for example, to retain two objects. As the fastener recovers from the stretch to its equilibrium state, the fastener shrinks to tightly fit about the retained objects.

In yet another embodiment, the molded elastomeric product is a strap or bandage, such as a bandage adapted for bracing an injured part of the body. In this embodiment, the strap is oriented by stretching the strap in a lengthwise direction and releasing it. At or after the last stretch, and before the strap shrinks to its final, relaxed position, the strap is rolled up about itself and secured or retained in the rolled position by a shunt. When the strap is unrolled, it may be wrapped around the injured part of the body, such that the strap tightens to a snug fit as it recovers to an equilibrium state.

Thus, the embodiments of the present invention provide methods and packaging combinations which utilize the recovery of molded elastomeric products from orientation, such that the products may advantageously shrink or tighten into arrangements that may otherwise be difficult to achieve. For example, in an embodiment in which the product is a pulley belt, the oriented pulley belt is adapted to shrink onto pulleys, which may simplify the assembly of the pulley system. In an embodiment in which the product is a fastener, the fastener may easily grasp objects and then subsequently shrink to a tight fit about the objects. In yet another embodiment in which the product is a strap or bandage, the bandage may be loosely applied, because the bandage is adapted to "self-tighten" about an injury. Further, the shunts according to the various embodiments allow the molded elastomeric products to be maintained in a stretched configuration for any number of hours, days or even weeks. Thus, the orientation does not have to occur at the same time, or even location, as the end use application of the product.

These and other objects, advantages, and features of the invention will be readily understood and appreciated by reference to the detailed description of the current embodiment and the drawings.

BRIEF DESCRIPTION OF THE DRAWINGS

FIG. 3A is a perspective view of a molded elastomeric strap in accordance with an embodiment of the present invention.

FIG. 3B is a perspective view of the strap during orientation.

FIG. 3C is a perspective view of a strap that has been rolled up while in a stretched configuration.

FIG. 3D is a perspective view of the strap including a shunt to prevent the strap from unrolling.

DETAILED DESCRIPTION OF THE CURRENT EMBODIMENTS

As shown in FIGS. 1A-1E, a molded elastomeric product according to one embodiment of the present invention is a pulley belt 10. Belt 10 is oriented, such as through a pattern of stretching and releasing belt 10, and mounted to a shunt adapted to retain belt 10 in an at least partially stretched position. When belt 10 is ready for use, the belt is removed from the shunt and is applied to pulleys before belt 10 recovers to an equilibrium position, such that belt 10 shrinks to fit on pulleys.

In the illustrated embodiment, belt 10 is a looped strip of elastomeric material that may be formed using conventional techniques and apparatus. For example, belt 10 may be injection molded using a conventional injection molding apparatus (not shown) having a die that is configured to provide a belt with a certain shape and features, such that the belt will take on the desired shape once any desired orientation has taken place. For example, because orientation is adapted to deform and lengthen belt 10, belt 10 may be molded as a smaller or shorter belt than is necessary for use on pulleys 20. In one embodiment, the belt 10 is manufactured by injecting the desired material into the die cavity, and may be formed from any suitable elastomeric material, the thickness of which will vary from application to application depending primarily on the anticipated loads applied to the pulley system. In one embodiment, belt 10 includes a circular cross section, although a variety of cross sectional shapes are possible.

Figure 1A:
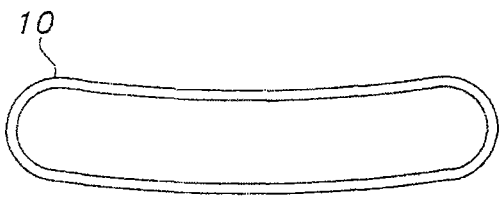
FIG. 1A is a side elevation of a molded elastomeric belt in accordance with one embodiment of the present invention.
Figure 1B:
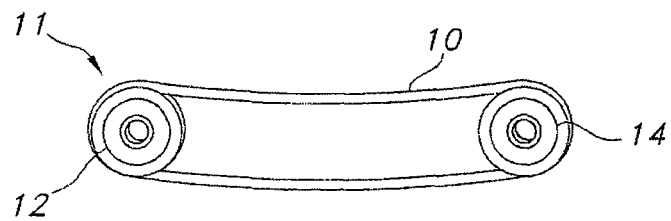
FIG. 1B is a side elevation of the belt mounted on an orienting machine.
Figure 1C:
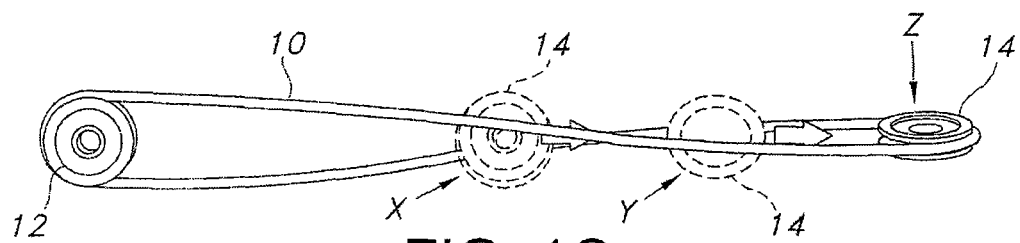
FIG. 1C is a side elevation of the belt being oriented by the orienting machine.
Figure 1D:
FIG. 1D is a side elevation of the belt mounted on a shunt adapted to retain the belt in a stretched configuration.
Figure 1E:
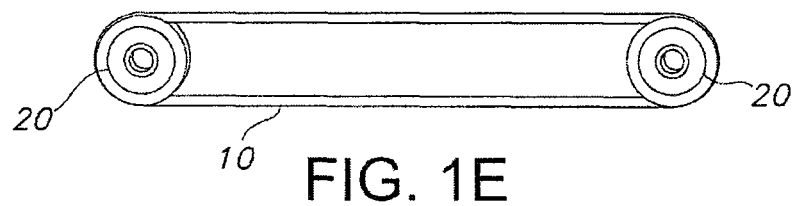
FIG. 1E is a side elevation of the oriented belt that has shrunk to fit on pulleys after removal from the shunt.

In one embodiment, the belt 10 is oriented, for instance, by stretching belt 10 past the yield point of the belt material and releasing the belt, with the stretching and releasing sequence being performed in a controlled manner and according to a predetermined pattern. (See FIGS. 1B and 1C). The precise amount and direction of stretch to be applied to belt 10 will depend on the configuration of the belt and the desired material characteristics. For example, it may be necessary to stretch belt 10 anywhere from one and a half to five times its original length to achieve the desired material characteristics. In one embodiment, the orientation of the belt 10 includes simultaneously stretching and twisting the belt. Specifically, in this embodiment, belt 10 is mounted to an orienting machine 11 having a drive pulley 12 and an orienting pulley 14. As drive pulley 12 drives belt 10 around pulleys 12 and 14, orienting pulley 14 pulls away from drive pulley 12 to stretch belt 10 and simultaneously pivots to twist belt 10. As shown in FIG. 1C, orienting pulley 14 begins to pivot at Position X and continues to simultaneously pivot and stretch belt 10 at Position Y. When belt 10 is fully stretched to the farthest point in the orientation process, orienting pulley 14 is positioned generally perpendicular, at an approximately 90 degree angle to drive pulley 12, as shown at Position Z. Belt 10 is then released from the stretched and twisted position, at which point belt 10 shrinks or retracts, such as in the manner of a stretched rubber band. For example, to release belt 10 from the stretch, orienting pulley 14 may retrace its steps, moving toward pulley 12 and twisting in an opposite direction. Although pulley 14 stretches and twists belt 10 in the illustrated embodiment, drive pulley 12 may optionally perform the stretching and twisting function. Alternatively, both pulleys may be capable of stretching and/or twisting belt 10. The amount of stretching and twisting may vary from application to application.

As a result of the plastic deformation from the stretching and twisting, and the increase in alignment of the crystalline structure, belt 10 will not fully return to its original length after being released. Rather, belt 10 will be elongated a certain portion of the stretched distance, with the precise amount of elongation being dependent in large part on the characteristics of the belt material. The sequence of stretching and/or twisting and releasing belt 10 may be repeated, in the same direction or in a different direction, depending on the desired material properties. The simultaneous stretching and twisting of belt 10 by pulleys 12 and 14, belt 10 may help to evenly orient the belt throughout its cross section and length. More particularly, the rotation of the belt on the pulleys may evenly distribute the orientation along the length of the belt 10, and the twisting of the belt on the pulleys may help to evenly distribute the orientation across the cross section of the belt 10. If a belt were to be stretched in around a set of pulleys in one direction without twisting, the outer portion of the belt (opposite pulleys 12 and 14) may be stretched to a greater extent than the inner portion of the belt (adjacent pulleys 12 and 14), which may result in uneven orientation may result in varied material characteristics throughout the belt.

At a point in the orientation process at which belt 10 is in a stretched position, belt 10 is mounted to shunt 16 to retain belt 10 in an at least partially stretched position. (See FIG. 1D). For example, belt 10 may be mounted to shunt 16 after the last stretch of the orientation process, but prior to the full recovery of belt 10 to its equilibrium state. Shunt 16 is sized such that it maintains the stress and strain levels on belt 10 until the belt is removed from the shunt, which will be discussed in more detail below. In the illustrated embodiment, shunt 16 is an elongated, oval-shaped structure that may optionally include a truss-like support 18 therein. Shunt 16 may be formed from any suitable material adapted to maintain the position of belt 10 until belt 10 is ready for use, such as on pulleys 20. (See FIG. 3E). Alternatively, the shunt may be a straight, elongated post, or another shape or material that holds the belt in a stretched position.

In the stretched or partially stretched position in which belt 10 is retained on shunt 16, belt 10 is longer than necessary, and possibly too long, to function on pulleys 20. Thus, when belt 10 is removed from shunt 16, belt 10 includes enough slack that it may be easily looped around or mounted to pulleys 20, without having to stretch belt 10 around pulleys 20 with tools or the like. While, and after, belt 10 is applied to pulleys 20, belt 10 recovers from the stretch in which it was retained on shunt 16 and retracts to snugly or tightly fit around pulleys 20. Thus, the recovery of belt 10 from the orientation process is used to advantageously position belt 10 around pulleys 20.

In another embodiment shown in FIGS. 2A-2E, the molded elastomeric product is a fastener 110. For example, in the illustrated embodiment fastener 110 is a snap-in type fastener adapted to retain two objects together (see FIG. 2E). Prior to use, fastener 110 is oriented, such as through a pattern of stretching and releasing the fastener. A shunt is mounted to fastener 110 while the fastener is in an at least partially stretched position. After removal of the shunt, fastener 110 is positioned to grasp the objects, such that fastener 110 shrinks to fit tightly around the retained objects as it recovers to an equilibrium state.

In the illustrated embodiment, fastener 110 includes a shaft 112 having a flange 114 at one end and a head 116 at an opposite end. Shaft 112 is generally cylindrical and has a diameter smaller than that of flange 114 and head 116. As shown, head 116 is tapered or cone-shaped and is adapted to collapse as it is inserted into an aperture in an object and then expand once it exits the aperture, and flange 114 is sized larger than the aperture to prevent it from being pushed through the aperture. A variety of alternative shapes and constructions for the head 116 and flange 114 are known. Thus, the fastener allows at least one object to be retained between flange 114 and head 116. Fastener 110 may be injection molded using a conventional injection molding apparatus and may be formed from any suitable elastomeric material, as described above with respect to belt 10.

Prior to use, fastener 110 is oriented, which may include stretching at least a portion of the fastener past the yield point of the material of the fastener and releasing the fastener, in a controlled manner and according to a pattern. As discussed above, the precise amount and direction of stretch to be applied to the fastener will depend on the configuration of the fastener and the desired material characteristics. In the illustrated embodiment, fastener 110 is oriented by stretching shaft 112 lengthwise and releasing shaft 112 to allow it to retract or shrink. (See FIG. 2B). Any known or conventional methods and apparatus may be used to accomplish the stretching of shaft 112, for example, an apparatus adapted to engage and separate the respective inner surfaces 118, 120 of flange 114 and head 116 (apparatus not shown). The process may be repeated as needed to achieve the desired material characteristics, as discussed above.

During the orientation of fastener 110, a shunt 122 is mounted to fastener 110 to retain shaft 112 of fastener 110 in an at least partially stretched position. (See FIGS. 2C and 2D). For example, shunt 122 may be mounted to fastener 110 after the last stretch of the orientation process, but prior to the full recovery of shaft 112 to an equilibrium state. In the illustrated embodiment, shunt 122 is a generally cylindrical, hollow structure adapted to receive or otherwise fit about shaft 112 of fastener 110. For example, shunt 122 may include a lengthwise opening or slot through which shaft 112 may be inserted. Ends 124 and 126 of shunt 122 are adapted to engage the respective inner surfaces 120, 118 of head 116 and flange 114 to maintain the distance between head 116 and flange 114, thus retaining shaft 112 in a stretched position. Shunt 122 may be formed from any suitable material adapted to maintain the position of fastener 110 until it is ready for use. Shunt 122, like shunt 16 above, maintains the stress and strain levels on fastener 110 until the shunt is removed from the fastener, which will be discussed in more detail below.

Figure 2A:
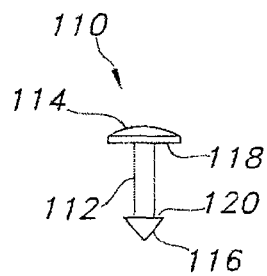
FIG. 2A is a side elevation of a molded elastomeric fastener in accordance with an embodiment of the present invention.
Figure 2B:
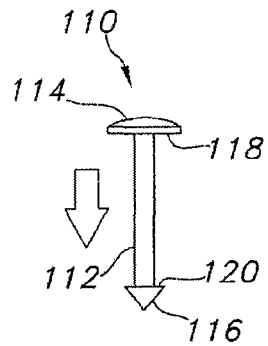
FIG. 2B is a side elevation of the fastener during orientation.
Figure 2C:
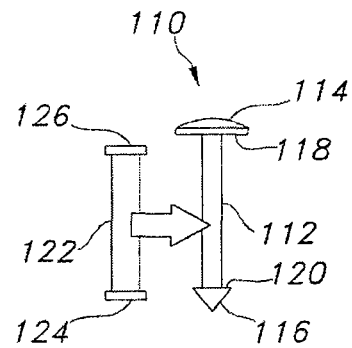
FIG. 2C is a side elevation of the fastener and a shunt adapted to retain the fastener in a stretched configuration.
Figure 2D:
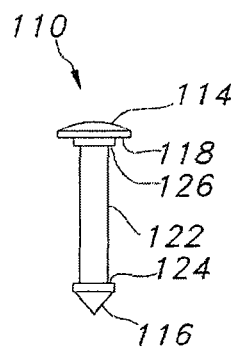
FIG. 2D is a side elevation of the shunt mounted to the fastener.
Figure 2E:
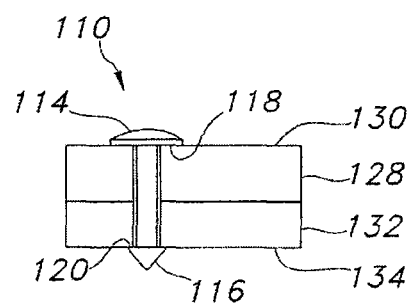
FIG. 2E is a side elevation of the fastener that has shrunk to retain objects after removal from the shunt.

As shown in FIGS. 2D and 2E, in the stretched or partially stretched position in which fastener 110 is retained by shunt 122, fastener 110 is longer than necessary to retain objects 128 and 132 together. Thus, shaft 112 is long enough such that fastener 110 may easily grasp objects 128 and 132 between flange 114 and head 116, without having to squeeze or compress (and possibly damage) the objects. As shaft 112 of fastener 110 recovers from the stretch in which it was retained on shunt 122, shaft 112 shrinks and decreases in length, such that the respective inner surfaces 118, 120 of flange 114 and head 116 engage and tighten about the respective outer surfaces 130, 134 of objects 128 and 132. Thus, the recovery of shaft 112 to its equilibrium state optimizes the use and function of fastener 110.

In yet another embodiment shown in FIGS. 3A-3D, the molded elastomeric product is a strap or bandage 210, such as a bandage adapted for bracing a part of the body, such as an injured arm or leg. Strap 210 is oriented by stretching and releasing the strap, and a shunt is used to retain strap 210 in an at least partially stretched position until it is ready for use. Strap 210 is then released from the shunt and wrapped around the desired portion of the body, whereby strap 210 shrinks to its equilibrium state and tightens to a snug fit around the desired part of the body.

In the illustrated embodiment, strap 210 is formed as an elongated strip of elastomeric material. Strap 210 may be injection molded using a conventional injection molding apparatus and may be formed from any suitable elastomeric material or woven fabric, as described above with respect to belt 10. The width and thickness of strap 210 may vary depending primarily on the anticipated use of the strap.

As shown in FIG. 3B, strap 210 is oriented by stretching the strap 210 in a lengthwise direction, past the yield point of the material of the strap, and releasing strap 210. As discussed above with respect to belt 10 and fastener 110, the precise amount and direction of stretch to be applied to strap 210 will depend on the desired material characteristics. In the illustrated embodiment, it may be necessary to stretch and release the belt at least twice.

During orientation, at some point before strap 210 shrinks to its final, equilibrium position, strap is rolled up about itself, with the strap being maintained in an at least partially stretched configuration throughout the rolling process. A shunt 212 is used to retain the remaining end 214 of strap 210 to another point on the strap itself, to prevent strap 210 from unrolling and thus retain strap 210 in a stretched configuration. (See FIGS. 3C and 3D). Because shipping an unrolled, stretched strap may be impractical, the rolled configuration of strap 210 not only maintains strap 210 in a stretched position, but also allows strap 210 to be easily packaged and/or shipped.

In the illustrated embodiment, shunt 212 is positioned at end 214 of strap 210, generally perpendicular to strap 210. Shunt 212 is retained at an opening 216 in strap 210, such that the ends of shunt 212 protrude at each side of strap 210. (See FIGS. 3A-3C). At an opposite end 215 of strap 210, strap 210 includes a shunt connector 218 having an aperture 220 at each side of strap 210. Strap 210 is rolled beginning at end 215 of strap 210 and toward end 214 (see FIGS. 3B and 3C). As shown in FIG. 3D, when strap 210 is rolled, the protruding ends of shunt 212 are inserted and retained in the respective apertures 220 of shunt connector 218, which are positioned at or near the center of rolled strap 210. Optionally, and as shown in FIG. 3D, shunt 212 is flexible, such that the ends of shunt 212 are adapted to be bent or adjusted to fit into apertures 220.

Optionally, strap 210 may include additional features to further retain the strap in the stretched position. For example, strap 210 may include at least one spike or barb 222 molded into or attached to at least one surface of the strap 210 and adapted to engage and puncture an opposite surface of strap 210 as the strap is rolled up (FIG. 3B). When engaged with the opposite surface of strap 210, spikes 222 may function as "shunts" by preventing strap 210 from unrolling while the strap is being rolled. Spikes 222 may also help to maintain a continuous and proper amount of stretch on strap 210. Alternatively, or additionally, strap 210 may include bumps or protrusions 224 on one surface of strap 210, with protrusions 224 having corresponding indentations or recesses molded into or cut into an opposite surface of strap 210. The recesses are adapted to receive and retain protrusions 224 as the strap is rolled, such that protrusions 224 may also function as "shunts," in a similar manner as spikes 222.

When strap 210 is ready for use, the ends of shunt 212 are released from apertures 220, and strap 210 is unrolled and wrapped around the desired part of the body. Unrolling strap 210 allows the strap to recover from the stretched position and retract to an equilibrium position. Thus, strap 210 may be easily or loosely wrapped around the desired body part, because strap 210 will shrink or tighten around the injured body part on its own as a result of the recovery of strap 210 from the stretched position. Thus, the recovery of strap 210 from the orientation process provides the desired pressure on an injury, without having to aggravate the injury during application of the strap.

Figure 4:
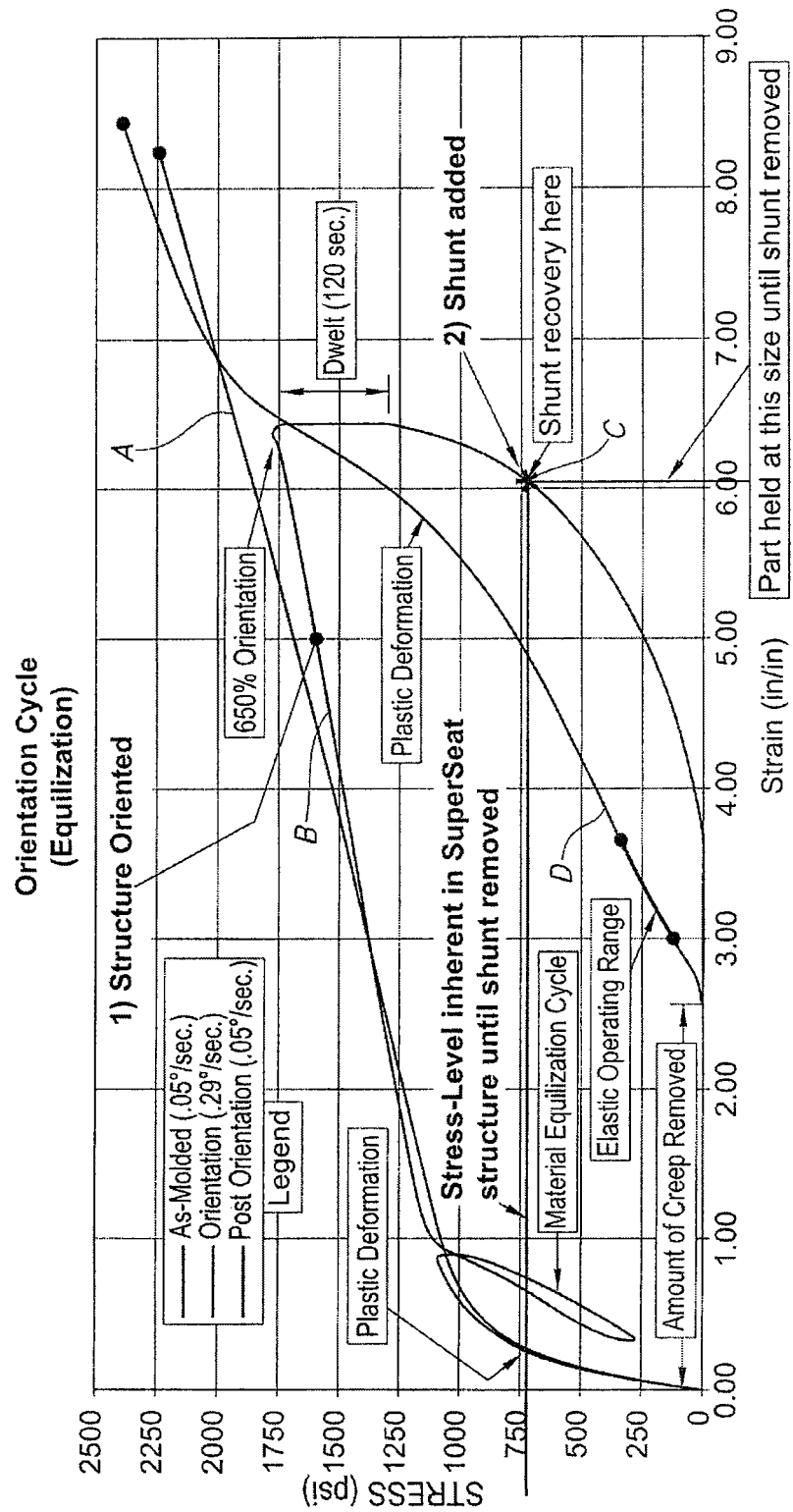
FIG. 4 is chart illustrating the stress and strain levels of a molded elastomeric product during orientation and during application of a shunt.

Regarding the stress and strain levels of molded elastomeric products during orientation, a graph showing an example of the changes in material properties of a particular molded product is shown in FIG. 4, which includes three different stress-strain curves and the effect on one of the curves when a shunt is applied to the molded product. The curves show engineering stress-strain (i.e. no accommodation for changes in surface area during deformation). Line A shows the stretching of an original, un-oriented, membrane to failure at 0.05 inches of stretch per second. The failure occurred at approximately 2250 lbs., at which point the material was stretched to about 825% of its original length.

Line B shows the orientation of the same type of product by stretching the product to about 650% of its original length, which occurred at approximately 1750 lbs. The product is then released and allowed to partially recover from the stretch. Before the product fully recovers, a shunt (such as one of shunts 16, 122, or 212 discussed in the above embodiments) is applied to the product, as shown by Point C on the chart. In the illustrated example, the shunt retains the part in the partially stretched position and maintains a stress level of approximately just under 750 psi and a strain level of approximately just over 6.00 in/in. Once the shunt is removed from the product (or the product is removed from the shunt), the product continues to follow the stress-strain curve shown by Line B. In this case, the material recovers to a final length that is over 3.5 times its original length, which illustrates the plastic deformation of the material after orientation.

Line D shows the stretching to failure of the oriented material. The material fails at approximately 2400 lbs. of force. As can be seen by comparing the elastic regions of lines A and D respectively, the oriented product shown in line D has a lower modulus of elasticity, such that it is more elastic than the original material and capable of completely recovering to its oriented length after receiving normal operating loads.

By way of disclosure, the present invention is described in connection with various alternative embodiments intended primarily for use in pulleys, fasteners and straps or bandages. The present invention is not, however, limited to use in these applications, but may also be incorporated into other applications in which it is advantageous that a molded elastomeric product shrink or tighten into its end use application.

The above description is that of various current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method of packaging a molded elastomeric material comprising:
    molding an elastomeric product in an initial state;
    orienting the product on an orienting machine by stretching or compressing the product to a deformed state to align a crystalline structure of the product in one direction, such that the product has different material characteristics in the one direction than in other directions;
    mounting the product on a periphery of a support unit, while in the deformed state, adapted to retain the product in an intermediate state between the deformed state and the initial state;
    storing the product on the support unit in the intermediate state for at least a predetermined amount of time; and
    releasing the product from the support unit for use such that the product recovers to an equilibrium state between the initial state and the intermediate state in use.

2. The method of claim 1 wherein the deformed state is one of an at least partially stretched position and an at least partially compressed position.

3. The method of claim 1 wherein the product is a belt, wherein the orienting machine includes a drive pulley and an orienting pulley, and wherein the orienting step includes moving the orienting pulley away from the drive pulley to at least one of stretch and twist the belt.

4. The method of claim 1 wherein the product is a fastener, wherein the orienting step includes stretching the fastener in a lengthwise direction.

5. The method of claim 4 wherein the fastener includes a head at one end and a flange at an opposite end, wherein the mounting step includes placing the support unit between the head and the flange.

6. The method of claim 5 further comprising removing the fastener from the support unit and applying the fastener to at least one object, wherein the fastener is adapted to shrink toward an equilibrium position until the head and the flange are tightened about the at least one object.

7. The method of claim 1 wherein the product is a strap, wherein the orienting step includes stretching the strap in a lengthwise direction.

8. The method of claim 7 wherein orienting the product includes rolling the strap about itself, wherein the deformed position is a rolled position.

9. The method of claim 8 further comprising applying the strap to a part of a human body, wherein the strap is adapted to shrink toward an equilibrium position until the strap is tightened about the part of the human body.

10. A method of packaging a molded elastomeric material comprising:
    molding an elastomeric product in an initial state;
    orienting the product on an orienting machine by deforming the product to a deformed state to align a crystalline structure of the product in one direction, such that the product has different material characteristics in the one direction than in other directions;
    mounting the product on a periphery of a support unit, while in the deformed state, adapted to retain the product in the deformed state; and
    releasing the product from the support unit for use such that the product recovers to an equilibrium state between the initial state and the deformed state,
    wherein the product is a belt, wherein the orienting machine includes a drive pulley and an orienting pulley, and wherein the orienting step includes moving the orienting pulley away from the drive pulley to at least one of stretch and twist the belt, and
    further comprising applying the belt to at least one pulley after the product is released from the orienting machine, wherein the belt is adapted to shrink toward an equilibrium position until the belt is tightened about the at least one pulley.

11. A method of packaging a molded elastomeric product on a temporary support unit for subsequent removal from the temporary support unit for positioning on a final product, comprising:
    molding an elastomeric material to form a product;
    orienting the product on an orienting machine by at least one of stretching and compressing the product to a deformed state;
    allowing the product to recover toward an equilibrium state and then at least one of stretching and compressing the product; and
    removably positioning the product on a periphery of the temporary support unit to retain the product in one of an at least partially stretched state and an at least partially compressed state.

12. The method of claim 11 wherein the orienting step includes deforming the product to align a crystalline structure of the product in one direction, such that the product has different material characteristics in the one direction than in other directions.

13. The method of claim 11 further comprising releasing the product from the temporary support unit, whereby the product is adapted to recover toward the equilibrium state.

14. The method of claim 11 wherein the temporary support unit is secured to one end of the product and wherein a support unit connector is secured to an opposite end of the product, wherein the securing step includes securing the temporary support unit to the support unit connector.

15. The method of claim 11 wherein the product is a strap, wherein stretching the product includes rolling the strap about itself, wherein the deformed state is a rolled position.

16. The method of claim 15 wherein the strap includes at least one spike extending from an upper surface thereof, the at least one spike being adapted to engage a lower surface of the strap as the strap is rolled to assist in retaining the strap in the rolled position.

17. The method of claim 16 further comprising applying the strap to at least one object after the temporary support unit is released from the strap, wherein the strap is adapted to shrink toward equilibrium state until the strap tightens about the at least one object.

* * * * *